United States Patent
Plagens et al.

(10) Patent No.: US 11,454,163 B1
(45) Date of Patent: Sep. 27, 2022

(54) TURBOCHARGER SYSTEM WITH TURBINE BYPASS CIRCUIT TO REDUCE EMISSIONS DURING ENGINE COLD START

(71) Applicant: FORD GLOBAL TECHNOLOGIES, LLC, Dearborn, MI (US)

(72) Inventors: Keith Michael Plagens, Northville, MI (US); Bradley Alan Boyer, Canton, MI (US); Gregory Patrick McConville, Ann Arbor, MI (US); Xiaogang Zhang, Novi, MI (US); Thomas Polley, Livonia, MI (US); Eric Warren Curtis, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/226,757

(22) Filed: Apr. 9, 2021

(51) Int. Cl.
| | |
|---|---|
| *F01N 3/20* | (2006.01) |
| *F01N 13/10* | (2010.01) |
| *F02B 37/18* | (2006.01) |
| *F02B 37/24* | (2006.01) |

(52) U.S. Cl.
CPC .......... *F02B 37/183* (2013.01); *F01N 3/2006* (2013.01); *F01N 13/107* (2013.01); *F02B 37/24* (2013.01)

(58) Field of Classification Search
CPC .... F01N 3/2006; F01N 13/107; F02B 37/183; F02B 37/24
See application file for complete search history.

(56) References Cited

U.S. PATENT DOCUMENTS

| | | | |
|---|---|---|---|
| 7,509,805 B2* | 3/2009 | Karlsson | F02B 37/001 60/612 |
| 9,074,521 B2 | 7/2015 | Russ | |
| 10,704,461 B2 | 7/2020 | Gerard et al. | |
| 2006/0059908 A1* | 3/2006 | Schorn | F02B 37/16 60/599 |
| 2012/0285164 A1* | 11/2012 | Kuhlbach | F02B 37/007 60/602 |
| 2016/0032869 A1* | 2/2016 | Boyer | F02D 17/02 123/568.11 |

FOREIGN PATENT DOCUMENTS

| | | | | |
|---|---|---|---|---|
| DE | 102019113741 A1 | | 11/2020 | |
| JP | 2016079928 A | * | 5/2016 | ............. D21H 11/18 |

* cited by examiner

*Primary Examiner* — Audrey B. Walter
(74) *Attorney, Agent, or Firm* — Vincent Mastrogiacomo; Brooks Kushman P.C.

(57) ABSTRACT

An engine system includes an engine having first and second exhaust manifolds each having outlet ports and a bypass runner. A first turbocharger is in fluid communication with the outlet port of the first manifold, and a second turbocharger in fluid communication with the outlet port of the second manifold. An exhaust aftertreatment device is in fluid communication with the first and second turbochargers. A turbocharger bypass circuit includes a valve assembly having an inlet side connected in fluid communication with the bypass runners of the first and second manifolds, an outlet side in fluid communication with the aftertreatment device, and a valve having an open position in which the inlet and outlet sides are in fluid communication and a closed position in which the inlet and outlet sides are not in fluid communication.

20 Claims, 7 Drawing Sheets

TURBOCHARGER SYSTEM WITH TURBINE BYPASS CIRCUIT TO REDUCE EMISSIONS DURING ENGINE COLD START

STATEMENT REGARDING FEDERALLY SPONSORED RESEARCH OR DEVELOPMENT

The invention was made with Government support under Contract No DE-EE0008878 awarded by the Department of Energy. The Government has certain rights to the invention.

TECHNICAL FIELD

This disclosure relates to turbocharged engine systems having a bypass circuit configured to bypass one or more turbochargers during engine cold start.

BACKGROUND

A vehicle may include an internal-combustion engine that is turbocharged to increase the power output without a substantial increase in an engine's displacement. The turbocharger has a turbine that is plumbed with an exhaust system and a compressor that is plumbed with an air intake. During operation, exhaust gases produced by the engine drive the turbine. The compressor, which is rotationally coupled to the turbine, provides boosted air, i.e., air having a pressure above atmospheric, to the intake manifold of the engine. The turbocharger is typically attached to the engine upstream of the catalytic converter.

SUMMARY

According to one embodiment, an engine system includes an engine having first and second exhaust manifolds each having outlet ports and a bypass runner. A first turbocharger is in fluid communication with the outlet port of the first manifold, and a second turbocharger in fluid communication with the outlet port of the second manifold. An exhaust aftertreatment device is in fluid communication with the first and second turbochargers. A turbocharger bypass circuit includes a valve assembly having an inlet side connected in fluid communication with the bypass runners of the first and second manifolds, an outlet side in fluid communication with the aftertreatment device, and a valve having an open position in which the inlet and outlet sides are in fluid communication and a closed position in which the inlet and outlet sides are not in fluid communication.

According to another embodiment, a turbocharger system includes a first turbocharger in fluid communication with a first set of engine cylinders and a second turbocharger in fluid communication with a second set of engine cylinders. A turbocharger bypass circuit includes a valve assembly having an inlet side in fluid communication with the first and second sets of engine cylinders and an outlet side in fluid communication with an exhaust aftertreatment device. A controller is programmed to, in response to a catalyst temperature of the aftertreatment device being less than a threshold, command a valve of the valve assembly to an open position, and, in response to the catalyst temperature of the aftertreatment device exceeding the threshold, command the valve to a closed position.

According to another embodiment, a method of operating a turbocharger system during engine cold start includes closing vanes of a variable geometry turbine of a turbocharger and opening a valve of a turbocharger bypass circuit when a temperature of a catalytic converter is less than a threshold temperature. The method further includes opening the vanes of the variable geometry turbine and closing the valve of the turbocharger bypass circuit when the temperature of the catalytic converter exceeds the threshold temperature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
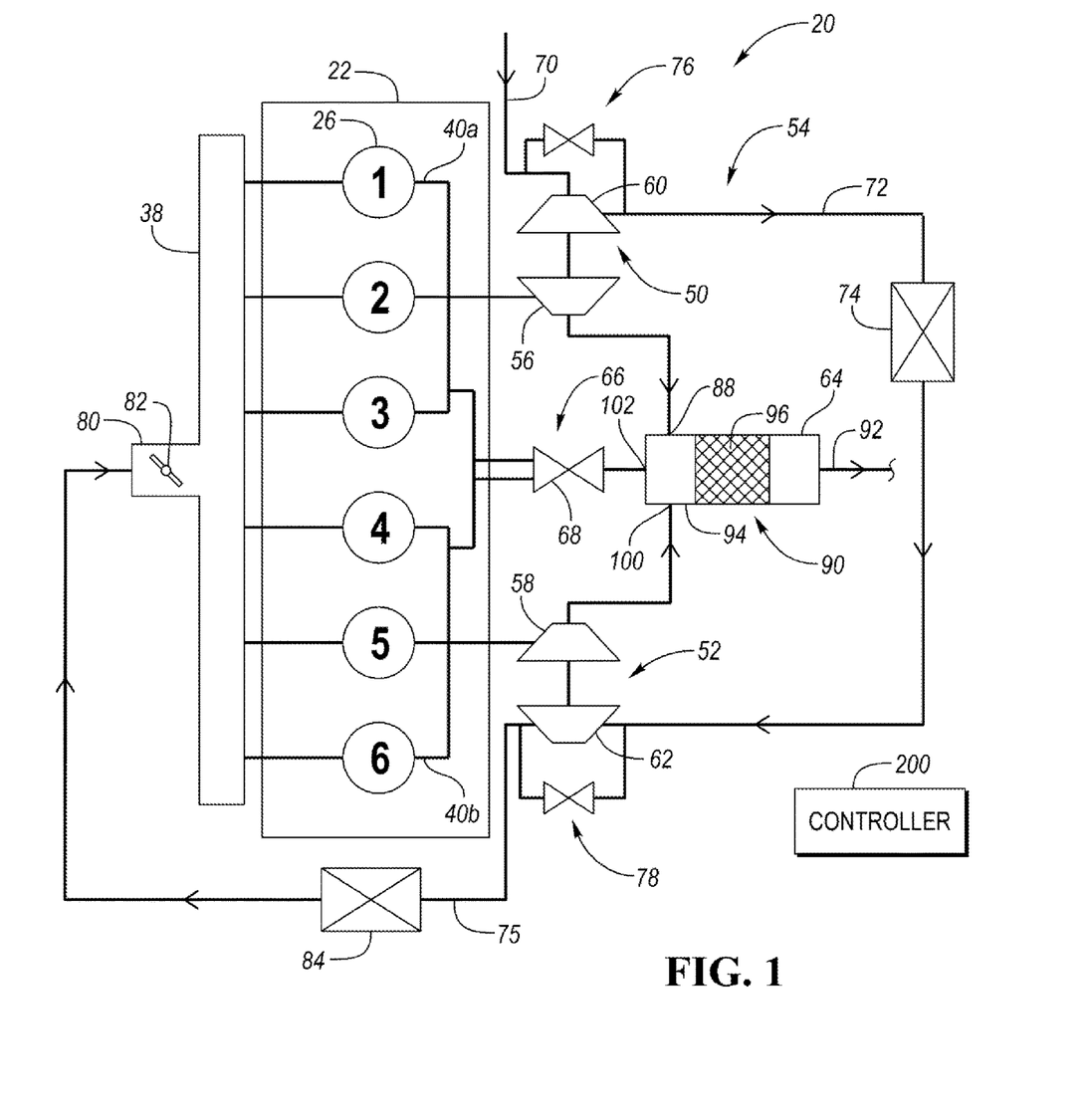
FIG. 1 is a schematic diagram of an engine system according to one or more embodiments.
Figure 2:
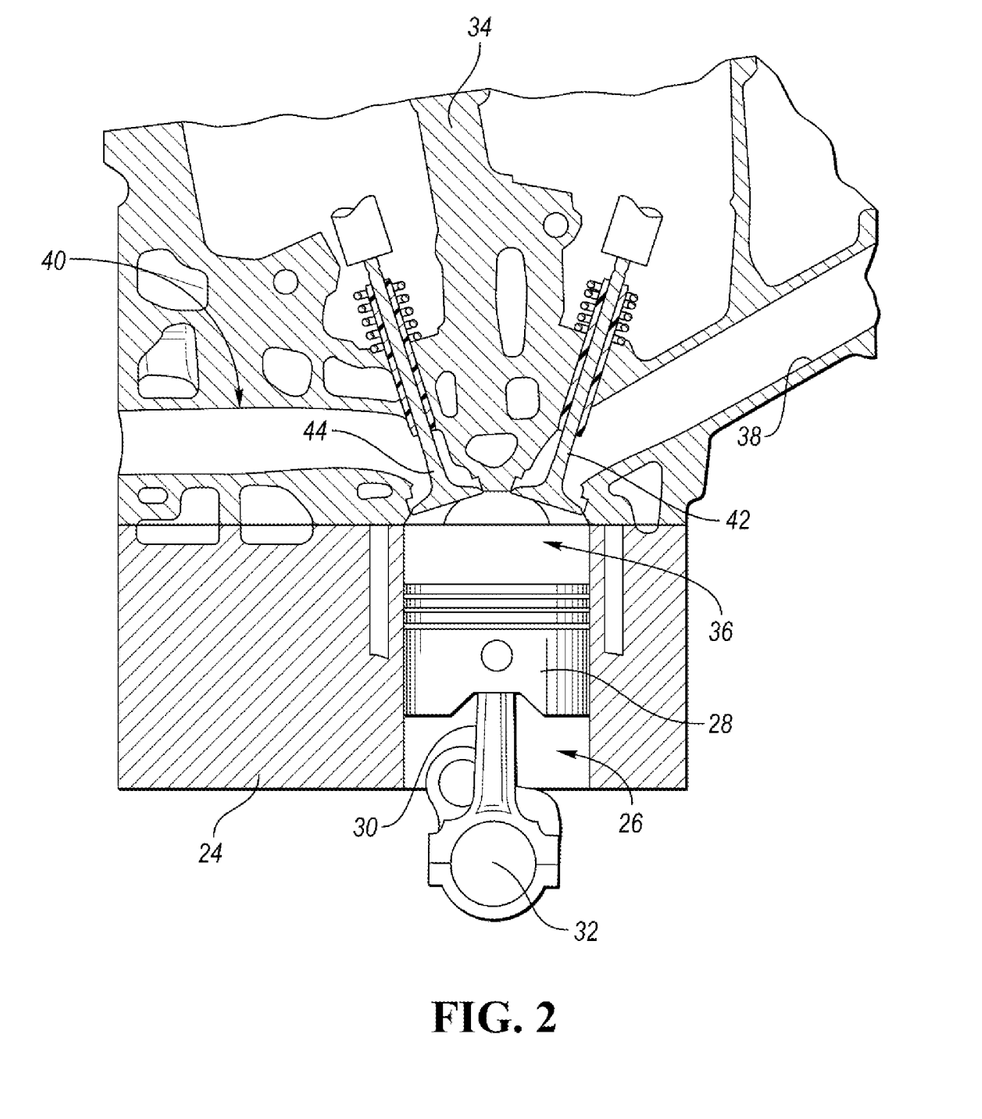
FIG. 2 is an end view, in cross section, of an engine of the engine system.

Referring FIGS. 1 and 2, an engine system 20 includes an engine 22 having an engine block 24 defining a plurality of cylinders 26. The illustrated block 24 is of an inline six-cylinder engine (also known as a "straight six"), however, this disclosure contemplates many engine configurations such as an inline four cylinder, an inline eight cylinder, a V6, a V8, or any other known configuration. Pistons 28 are supported in the cylinders 26. Each of the pistons 28 includes a rod 30 that connects with the crankshaft 32. A cylinder head 34 is connected on top of the block 24. The cylinder head 34 cooperates with the block 24 to form combustion chambers 36. The combustion chambers 36 receive intake air from an intake manifold 38. Similarly, exhaust combustion gases exit the combustion chambers 36 and are transported away by one or more exhaust manifolds 40. Intake valves 42 and exhaust valves 44 selectively connect the combustion chambers 36 in fluid communication with the intake and exhaust manifolds 38, 40. The intake and exhaust valves 42, 44 are opened and closed by one or more camshafts (not shown). In the illustrated embodiment, the engine 20 has dual-overhead camshafts with four valves per cylinder, but this is just one example.

The engine system 20 is turbocharged and includes one or more turbochargers. In the illustrated embodiment, the engine system 20 includes a turbocharger system 54 having twin-turbochargers 50, 52. In other embodiments, only a single turbocharger may be provided. Additionally, the turbocharger system may include more than two turbochargers. The turbochargers include turbines 56, 58 and compressors 60, 62. The turbines 56, 58 are rotationally coupled to the compressors 60, 62, respectively, such as by shafts or the like.

The engine 22 may include two exhaust manifolds that each service a bank, or subset, of the cylinders. For example, a first exhaust manifold 40a is associated with cylinders 1, 2, and 3, and a second exhaust manifold 40b is associated with cylinders 4, 5, and 6. The first exhaust manifold 40a it is associated with the first turbocharger 50, and the second exhaust manifold 40b is associated with the second turbocharger 52. For example, the turbine 56 includes an inlet that is in fluid communication with the outlet of the exhaust manifold 40a. The outlet of the turbine 56 is connected in fluid communication with an aftertreatment device 64, e.g., a catalytic converter. The turbine 58 includes an inlet that is in fluid communication with the outlet of the exhaust manifold 40b, and the outlet of the turbine 58 is in fluid communication with the aftertreatment device 64. As will be explained in more detail below, the turbocharger system 54 also includes a turbine bypass circuit 66 configured to deliver exhaust gases directly from the exhaust manifolds 40 to the aftertreatment device 64 to reduce a light-off time of the aftertreatment device 64. The bypass circuit 66 includes a valve assembly 68 configured to directly control the amount of exhaust gases flowing through bypass circuit and indirectly control the amount of exhaust gases flowing through the turbines 56, 58 of the turbochargers 50, 52.

The turbochargers 50, 52 may have the turbines arranged in parallel, e.g., each turbine receives parallel exhaust flow from dedicated exhaust manifolds, and the compressors arranged in series. The compressor 60 may be referred to as the low-pressure compressor and the compressor 62 may be referred to as a high-pressure compressor. The compressor 60 includes an inlet that receives air at atmospheric pressure through an air box and associated plumbing 70. The outlet of the low-pressure compressor 60 is connected in fluid communication with the inlet of the high-pressure compressor 62 by one or more conduit 72. A first heat exchanger 74, e.g., an intercooler, is disposed between the compressors to reduce the air temperature prior to the second compressor 62. A compressor recirculation valve system 76 may be provided to route air around the compressor 60. The valve system 76 may be bidirectional allowing air to flow in the reverse direction to avoid compressor surge during a transient maneuver such as throttle tip out. The valve system 76 may also allow air to flow in the forward direction around the compressor 60 if needed. The valve system 76 may include a valve and conduit. The valve may be controlled by electric signal, vacuum, or the like.

The second compressor 62 includes an inlet connected in fluid communication with the outlet of the first compressor 60, and includes an outlet connected in fluid communication with a throttle body 80 via one or more conduit 75. The throttle body 80 includes a throttle 82, e.g., a butterfly valve, that controls the amount of air entering the intake manifold 38. Another heat exchanger 84, e.g., an intercooler, may be provided to cool the air and increase the density of the intake air charge thereby improving engine performance. The second compressor 62 may also include an associated valve system 78.

During normal operation, exhaust gases exiting the exhaust manifolds 40 enter into the turbines of the turbochargers 50, 52. The exhaust gases rotate the turbines at a high angular velocity. Rotation of the turbines is transferred to the compressors 60, 62, which in turn rotate to compress the intake air that is delivered to the intake manifold 38. The amount of boost depends on the flow of the exhaust gases and the designs of the turbochargers. In the illustrated embodiment, the turbochargers 50 and 52 may be the same design, however, in other embodiments, the turbochargers may be differently sized to provide a desired boost and performance, e.g., reduce turbo-lag, increase boost pressure, etc. In other embodiments, the compressors may be arranged in parallel rather than in series.

An exhaust system 90 may include one or more exhaust pipes 92, the aftertreatment device 64, one or more mufflers, a tailpipe, and the like. The aftertreatment device 64 includes a housing or body 94 containing a catalyst 96. The body 94 may also define three inlets: a first inlet 88 in fluid communication with the turbine 56, a second inlet 100 in fluid communication with the turbine 58, and a third inlet 102 in fluid communication with the bypass circuit 66. The catalyst 96 may be a two-way converter that combines oxygen with carbon monoxide and unburned hydrocarbons to produce carbon dioxide and water, or a three-way converter that also reduce oxides of nitrogen. The catalyst 96 may comprise a ceramic carrier matrix having a plurality of channels. A highly porous ceramic coating, sometimes referred to as a washcoat, is applied to the surface of the channels to increase the surface area. Chemical catalysts, such as precious metals platinum, palladium, and/or rhodium, are embedded in the washcoat.

The catalyst 96 is highly efficient at converting the raw exhaust gases into the desired reaction products once operating temperatures are reached. Below this temperature, and more specifically below the light-off temperature, e.g., 300 degree Celsius, the chemical reactions do not take place or are incomplete. Thus, it is advantageous to heat the catalyst quickly. The emissions produced during cold start of the engine may account for as much as one third of total emissions during a drive cycle. As such, reducing the warmup time of the aftertreatment device 64 is effective for reducing emissions.

The turbochargers 50 and 52 are upstream of the aftertreatment device 64 and can delay light-off of the catalyst 96 compared to a naturally aspirated engine. The turbochargers 50 and 52 include housings as well as several other components that act as heat sinks absorbing thermal energy from the exhaust gases that would otherwise be delivered directly to the aftertreatment device 64. The engine system 20 includes the bypass circuit 66 to direct exhaust flow around the turbochargers 50 and 52 and deliver it directly to the aftertreatment device 64 to facilitate heating of the catalyst 96 and reduce the light-off time.

Figure 3:
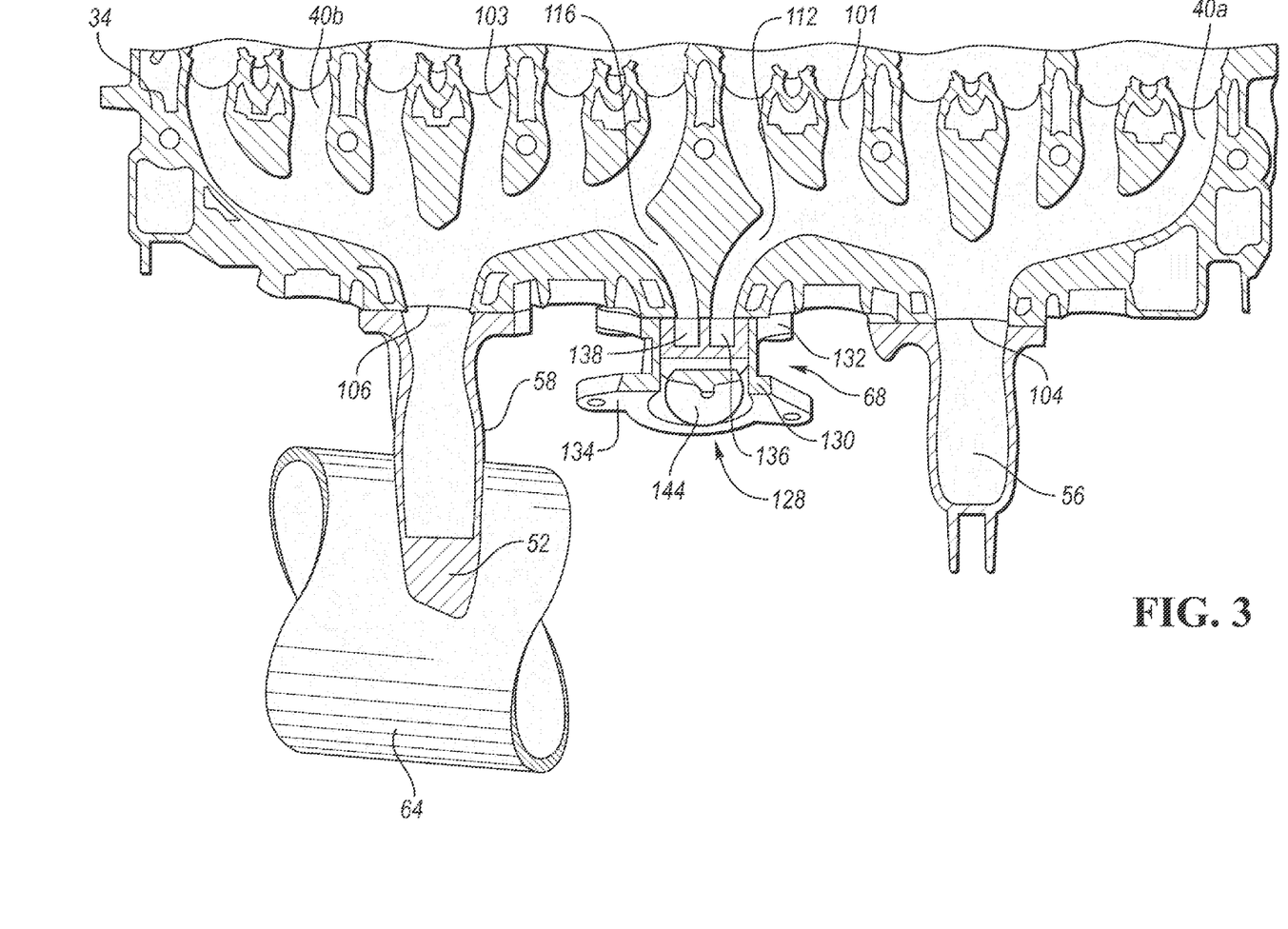
FIG. 3 is a top view, in cross section, of the engine system.
Figure 4:
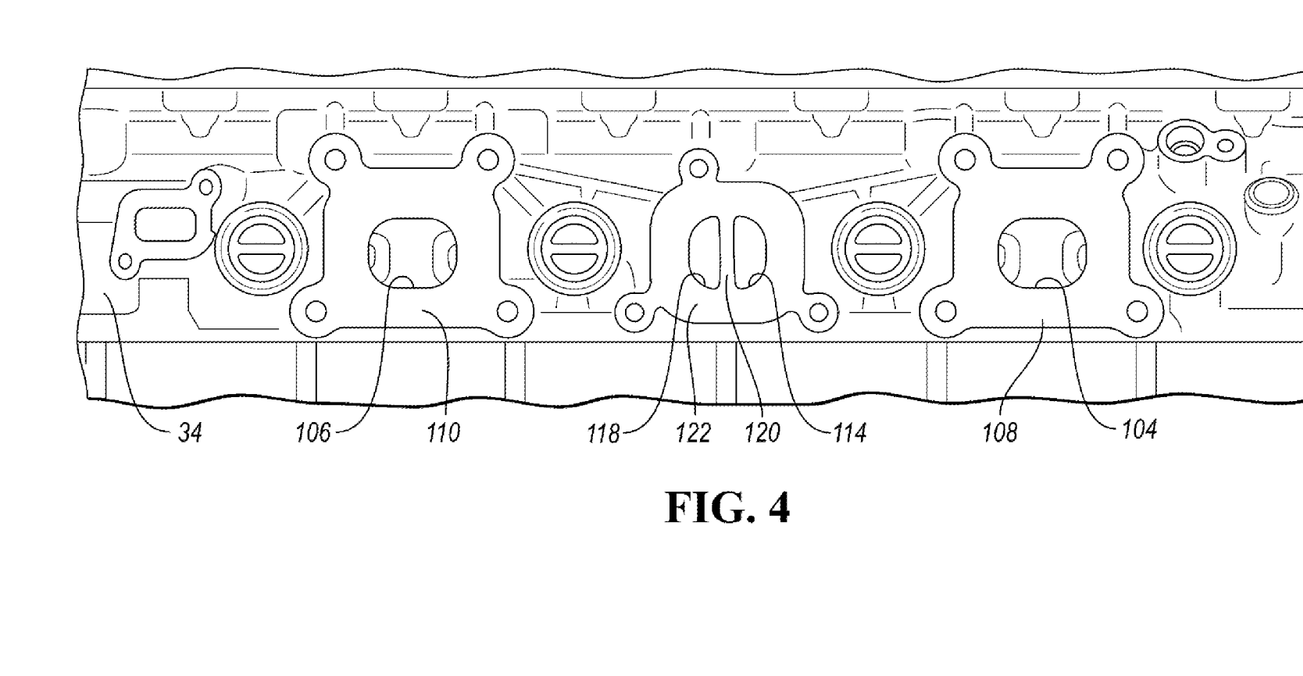
FIG. 4 is a side view of a cylinder head of the engine.

Referring to FIGS. 3 and 4, the exhaust manifolds 40 may be integrated into the cylinder head 34. This may be referred to as an integrated exhaust manifold. In this configuration, the casting of the cylinder head 34 defines the exhaust manifold in contrast to the traditional design in which a separate component is bolted to the side of the engine. Of course, in other embodiments, a conventional exhaust manifold may be utilized. The casting of the cylinder head 34 defines a plurality of exhaust runners 101 of the manifold 40a and exhaust runners 103 of the manifold 40b. The number of runners may be equal to the number of exhaust valves, which is 12 in the illustrated embodiment.

The runners 101 individually extend from the associated cylinders and gradually converge with other runners until they all converge at the outlet port 104. The runners 103 are similarly structured and exit the cylinder head 34 at the outlet port 106. The outlet ports 104, 106 may be disposed on a side of the cylinder head 34. The cylinder head 34 may include bosses 108 and 110 that define the ports 104, 106 and provide mounts. The turbocharger 50 may be attached directly to the cylinder head 34 at the boss 108, such as by bolts or the like. The inlet of the turbine 56 is attached to the boss 108 such that it is in alignment with the outlet port 104 to connect the manifold 40a and the turbine 56 in fluid communication. The turbocharger 52 may attached directly to the cylinder head 34 at the boss 110, such as by bolts or the like. The inlet of the turbine 58 is attached to the boss 110 such that it is in alignment with the outlet port 106 to connect the manifold 40b and the turbine 58 in fluid communication.

Each of the manifolds 40 may include at least one bypass runner defined by the casting of the cylinder head or by a separate exhaust manifold in other embodiments. For example, the first manifold 40a includes a bypass runner 112 that extends from the main portion of the manifold to an outlet port 114. The bypass runner 112 may be arranged in fluid communication with each of the exhaust runners 101. The second manifold 40b includes another bypass runner 116 that extends from the main portion of the manifold to an outlet port 118. The bypass runner 116 may be arranged in fluid communication with all of the exhaust runners 103. The bypass runners 112 and 116 are bifurcated such that they are completely separate within the cylinder head 34. That is, fluids within these runners cannot mixed with each other. As shown in FIG. 4, the outlets 114 and 118 are separated by a wall 120. The outlet ports 114 and 118 may be defined on a third boss 122 that is configured to attach with the bypass circuit 66.

Figure 5:
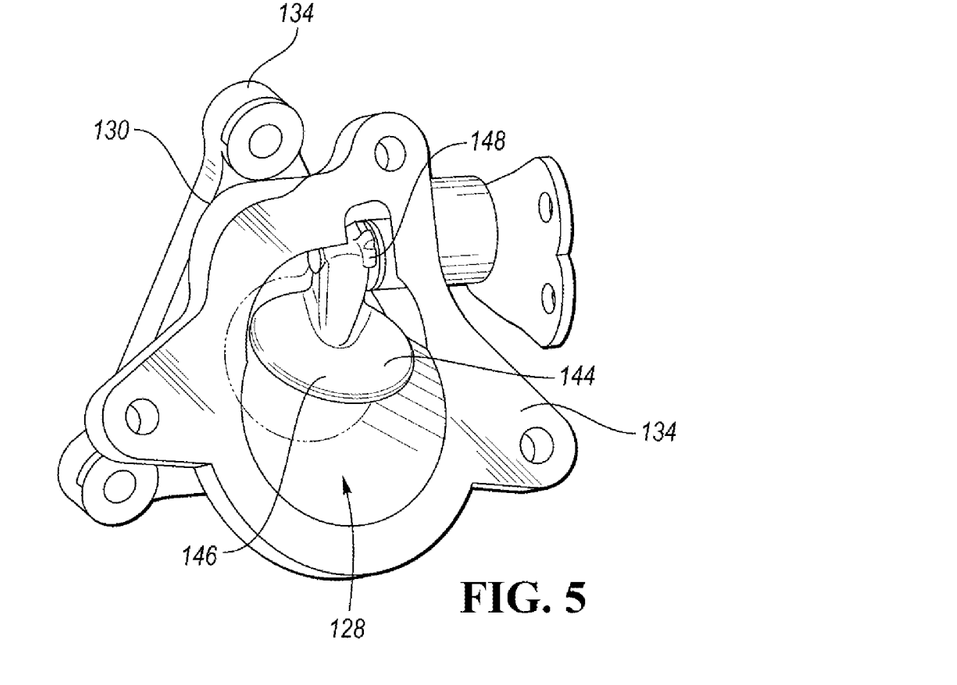
FIG. 5 is a back perspective view of a valve assembly of the engine system.
Figure 6:
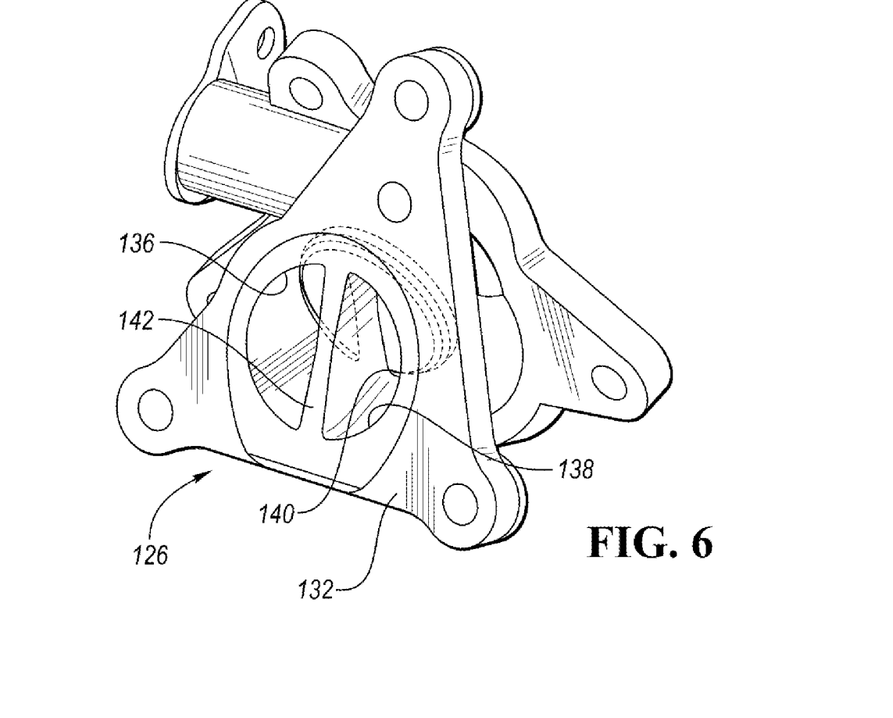
FIG. 6 is a front perspective view of the valve assembly.

Referring to FIGS. 3, 5, and 6, the bypass circuit 66 includes a valve assembly 68 having an inlet side 126 connected in fluid communication with the bypass runners 112, 116 of the first and second manifolds and an outlet side 128 in fluid communication with the aftertreatment device 64. The valve assembly 68 includes a body 130 having a front flange 132 attached to the boss 122 and a rear flange 134 connected to a conduit or flange associated with the aftertreatment device 64. The conduit or flange connects the outlet side 128 with the inlet 102 of the aftertreatment device 64. The valve body 130 defines a pair of bifurcated inlet passages 136 and 138 that extend from the inlet side 126 to a valve seat 140. A wall 142 of the body 130 separates the passages all the way to the valve seat 140. The inlet passage 136 is associated with the first manifold 40a and is aligned with and in fluid communication with the bypass runner 112 when the valve assembly is attached to the cylinder head. The inlet passage 138 is associated with the manifold 40b and is aligned with and in fluid communication with the bypass runner 116 when the valve assembly is attached to the cylinder head. A valve 144 is movably supported within the valve body 130. The valve 144 may include a flap 146 pivotally supported by a pivot member 148. The flap 146 is pivotable between a closed position in which the flap 146 is sealed against the valve seat 140 preventing the flow of exhaust gases through the bypass circuit 66 and an open position in which the flap 146 is spaced from the valve seat 140 permitting the flow of exhaust gases through the bypass circuit 66. The valve 144 may be electronically actuated by an actuator arrangement (not shown) that includes an electric motor or other actuator. The valve assembly 68 is designed so that when the valve 144 is in the closed position, the inlet passages 136, 138 are fluidly isolated from each other.

The exhaust runners 112 and 116 and the inlet passages 136 and 138 are designed to form two bifurcated flow paths from the manifolds to the valve 144. This eliminates pulse interference (a technique known as pulse separation) between cylinders or banks of cylinders. When the valve 144 is closed, cylinder to cylinder interference is prevented. Upon opening the valve, exhaust flow is routed straight to the aftertreatment device to reduce the time required to achieve catalyst light-off. The valve 144 may also function as an external wastegate device to limit boost pressure and/or turbo charger speed for overspeed protection.

Figure 7A:
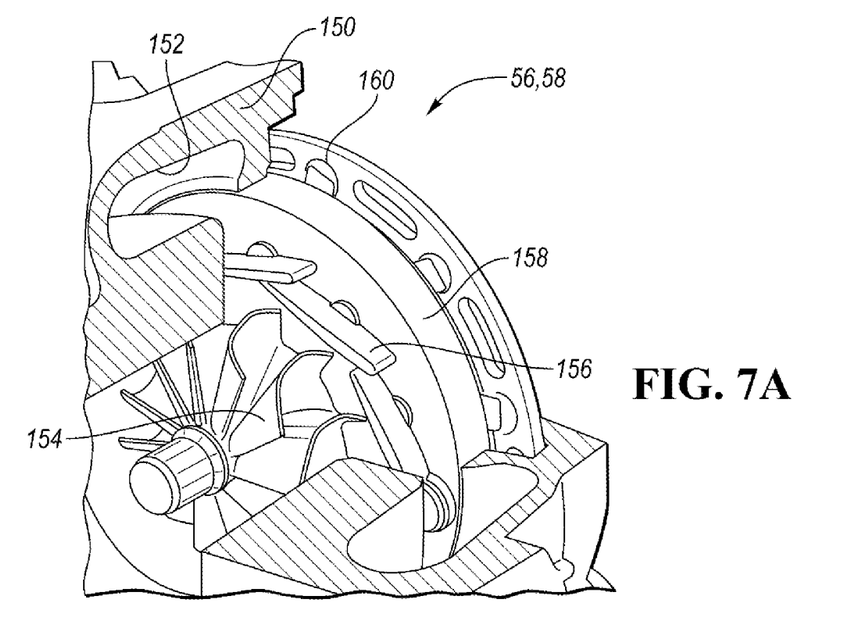
FIGS. 7A and 7B are perspective views of a variable geometry turbine in closed and opened positions, respectively.
Figure 7B:
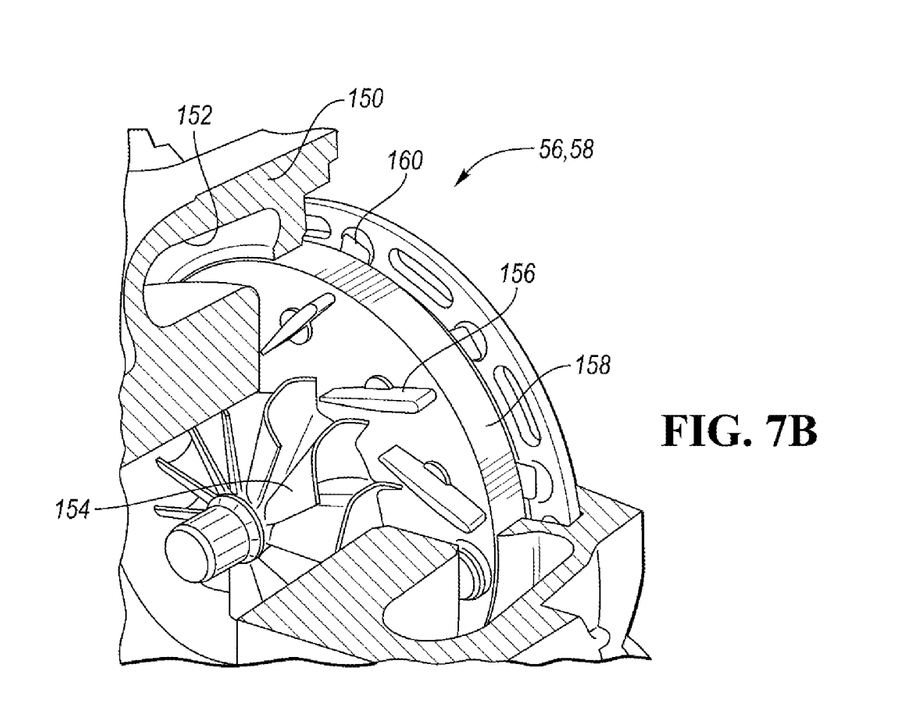

Referring to FIGS. 7A and 7B, the turbines 56 and 58 may be variable geometry turbines (VGTs). Each of the turbines may include a housing 150 defining a cavity 152. A turbine wheel 154 is disposed within the cavity 152. A plurality of vanes 156 circumscribe the turbine wheel 154 and are rotatably supported on a support disk 158. The vanes 156 are rotatable to change the effective aspect ratio of the turbocharger. An actuator 160 is operably coupled with the vanes 156 and configured to rotate them between a closed position as shown in FIG. 7A and a plurality of open positions, one of which is illustrated in FIG. 7B. When the vanes 156 are in the closed position, the air flow path through the turbine is highly restricted to substantially inhibit the flow of exhaust gases through the turbine.

During an engine cold start, the vanes 156 of the variable geometry turbines may be closed and the valve assembly 68 may be opened to route the majority of the exhaust gases straight to the catalyst 96 in order to reduce the light-off time and in turn reduce engine emissions. While some exhaust gases may pass through the closed turbines, the turbochargers are effectively closed for the purposes of routing most of the exhaust gases directly to the aftertreatment device 64 via the bypass circuit 66 when the valve 68 is open during engine cold start.

Referring back to FIG. 1, the engine system 20 includes one or more controllers 200 such as a powertrain control unit (PCU) and/or an engine control module (ECM). While illustrated as one controller, the controller 200 may be part of a larger control system and may be controlled by various other controllers throughout a motor vehicle, such as a vehicle system controller (VSC). It should therefore be understood that the controller 200 and one or more other controllers can collectively be referred to as a "controller" that controls various actuators in response to signals from various sensors to control functions. Any reference to a controller refers to one or more controllers. The controller 200 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller 200 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 200 within each of the systems and subsystems identified above. For example, the controller may be programmed to sense an engine cold start condition and control the VGTs and the valve assembly 68 accordingly. The controller may be further programmed to sense a light-off condition of the catalyst and control the turbo system to a normal operating mode. These, of course, are just a few examples of the capabilities of the controller 200.

Control logic or functions performed by controller 200 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 200. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 8:
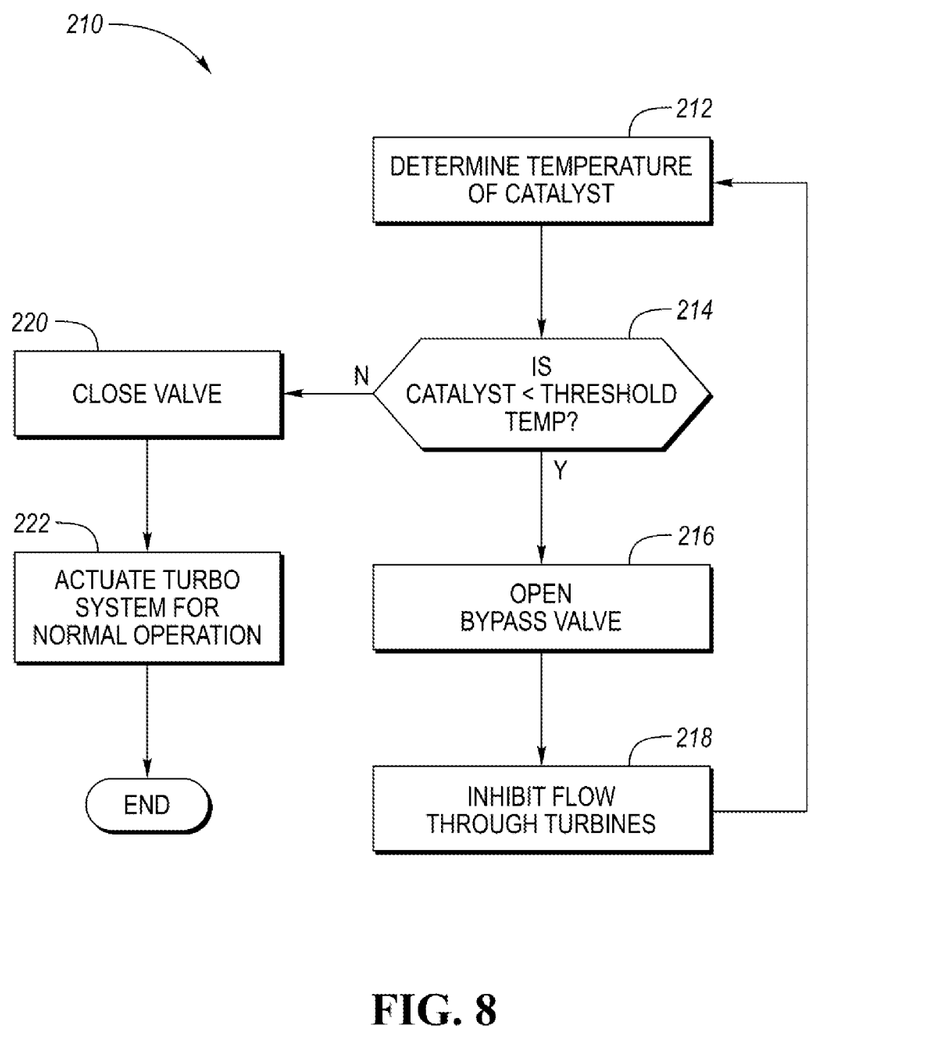
FIG. 8 is a flow chart of an algorithm for controlling a turbocharger system.

FIG. 8 is a flowchart 210 of an algorithm for controlling a turbocharger system. Control begins at operation 212 where the controller determines a temperature of the catalyst in the aftertreatment device. The temperature of the catalyst may be directly measured or inferred from other measurements and data based on simulations and modeling as is known in the art. At operation 214, the controller determines if the catalyst is less than the threshold temperature. The threshold temperature may be based on the light-off temperature, and, in some embodiments, may be equal to the light-off temperature. If yes, an engine cold start condition is detected. In response, the turbocharger system is actuated to a cold start routine. At operation 216, the controller opens the bypass valve associated with the bypass circuit to permit the flow of exhaust gases directly from the engine to the aftertreatment device thereby routing a substantial portion of exhaust gases around the turbochargers. To further facilitate the flow of exhaust gases through the bypass circuit, the flow through the turbines of the turbochargers is inhibited at operation 218. Some flow may still be allowed through the turbines. In one embodiment, the turbochargers have variable geometry turbines that are commanded to the closed position at operation 218 to inhibit the flow. In an alternative embodiment, valves may be positioned between the turbines and the exhaust manifold. The valves may be actuated to a closed position during the cold start routine to inhibit flow to the turbines. The closed position may or may not be a fully closed position.

The turbocharger system will remain in the cold start routine until the catalyst temperature exceeds the threshold. If no at operation 214, control passes to operation 220 and the bypass valve is closed. At operation 222, the turbocharger system is actuated for normal operation in which exhaust gases freely flow through the turbines. For example, if the turbocharger system has VGTs, the controller commands the VGTs to one of the open positions at operation 222. Alternatively, if upstream turbine valves are provided, they are commanded open at operation 222. In some embodiments, it may be advantageous to first open the VGT to allow some flow through the turbines while continuing to heat the catalyst through the bypass. In this way, when the bypass is closed and all flow goes through the turbines, the flow exiting the turbines will be hotter than it would be if flow was switched all at once. If switched all at once, the cold flow from the turbines could drop the temperature at the catalyst to below the threshold, causing loss of catalyst efficiency.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine system comprising:
   an engine including first and second exhaust manifolds having outlet ports and a bypass runner;
   a first turbocharger in fluid communication with the outlet port of the first manifold;
   a second turbocharger in fluid communication with the outlet port of the second manifold;
   an exhaust aftertreatment device in fluid communication with the first and second turbochargers; and
   a turbocharger bypass circuit including a valve assembly having an inlet side connected in fluid communication with the bypass runners of the first and second manifolds, an outlet side in fluid communication with the aftertreatment device, and a valve having an open position in which the inlet and outlet sides are in fluid communication and a closed position in which the inlet and outlet sides are not in fluid communication, wherein the exhaust aftertreatment device includes a first inlet connected in fluid communication with the first turbocharger, a second inlet connected in fluid communication with the second turbocharger, and a third inlet connected in fluid communication with the outlet side of the valve assembly.

2. The engine system of claim 1, wherein the valve assembly further has a body defining a first inlet passage in fluid communication with the bypass runner of the first manifold and a second inlet passage in fluid communication with the bypass runner of the second manifold, and wherein the valve is disposed over the first and second inlet passage when in the closed position.

3. The engine system of claim 1, wherein the engine further includes a plurality of cylinders, and wherein the first exhaust manifold is associated with a first set of the cylinders and the second exhaust manifold is associated with a second set of the cylinders.

4. The engine system of claim 1, wherein the first turbocharger further includes a compressor, and the second turbocharger further includes a compressor that is arranged in series with the compressor of the first turbocharger.

5. The engine system of claim 1, wherein the engine further includes a cylinder head that defines the first and second exhaust manifolds therein.

6. The engine system of claim 1, wherein each of the turbochargers includes a variable geometry turbine.

7. The engine system of claim 6 further comprising a controller programmed to, in response to a catalyst temperature of the aftertreatment device being less than a threshold, command the valve to the open position and command each of the variable geometry turbines to a closed position such that exhaust gases are routed from the engine to the bypass circuit to facilitate heating of the aftertreatment device.

8. The engine system of claim 7, wherein the controller is further programmed to, in response to the catalyst temperature of the aftertreatment device exceeding the threshold, command the valve to the closed position and command each of the variable geometry turbines to an open position such that the exhaust gases are routed through the turbochargers.

9. An engine system comprising:
an engine including a cylinder head defining first and second exhaust manifolds each having an outlet port and a bypass runner, wherein the cylinder head has a first boss defining the outlet port of the first manifold, a second boss defining the outlet port of the second manifold, and a third boss defining a first outlet port of the bypass runner of the first manifold and a second outlet port of the bypass runner of the second manifold;
a first turbocharger in fluid communication with the outlet port of the first manifold;
a second turbocharger in fluid communication with the outlet port of the second manifold;
an exhaust aftertreatment device in fluid communication with the first and second turbochargers; and
a turbocharger bypass circuit including a valve assembly having an inlet side connected in fluid communication with the bypass runners of the first and second manifolds, an outlet side in fluid communication with the aftertreatment device, and a valve having an open position in which the inlet and outlet sides are in fluid communication and a closed position in which the inlet and outlet sides are not in fluid communication, wherein the first turbocharger is attached to the first boss, the second turbocharger is attached to the second boss, and the valve assembly is attached to the third boss.

10. The engine system of claim 9, wherein the valve assembly further has a body defining a first inlet passage disposed against the first outlet port and a second inlet passage disposed against the second outlet port.

11. An engine system comprising:
an engine including a block defining first and second sets of cylinders, reciprocating pistons each disposed in one of the cylinders, and a crankshaft connected to all of the pistons;
a first turbocharger including variable geometry turbine in fluid communication only with the first set of engine cylinders;
a second turbocharger including variable geometry turbine in fluid communication only with the second set of engine cylinders;
a turbocharger bypass circuit including a valve assembly mounted to the block and having an inlet side in fluid communication with the first and second sets of engine cylinders and an outlet side in fluid communication with an exhaust aftertreatment device; and
a controller programmed to:
in response to a catalyst temperature of the aftertreatment device being less than a threshold, command a valve of the valve assembly to an open position,
in response to the catalyst temperature of the aftertreatment device exceeding the threshold, command the valve to a closed position,
in response to the catalyst temperature being less than the threshold, command the variable geometry turbines to a closed position, and
in response to the catalyst temperature exceeding the threshold, command the variable geometry turbines to an open position.

12. The engine system of claim 11, wherein the exhaust aftertreatment device includes a catalyst, and the threshold is based on a light-off temperature of the catalyst.

13. The engine system of claim 11, wherein the first turbocharger further includes a compressor, and the second turbocharger further includes a compressor that is arranged in series with the compressor of the first turbocharger.

14. The engine system of claim 11, wherein the valve assembly further has a body defining a first inlet passage in fluid communication with the first set of engine cylinders and a second inlet passage in fluid communication with the second set of engine cylinders.

15. The engine system of claim 14, wherein the valve has a flap disposed over the first and second inlet passages when in the closed position and is spaced from the first and second inlet passages when in the open position.

16. The engine system of claim 14, wherein the first and second inlet passages are bifurcated.

17. The engine system of claim 11, wherein the block further defines first and second exhaust manifolds in fluid communication with the first and second sets of cylinders, respectively, and each having an outlet port and an exhaust runner.

18. The engine system of claim 17, wherein the cylinder head has a first boss defining the outlet port of the first manifold, a second boss defining the outlet port of the second manifold, and a third boss defining a first outlet port of the bypass runner of the first manifold and a second outlet port of the bypass runner of the second manifold, and wherein the first turbocharger is attached to the first boss, the second turbocharger is attached to the second boss, and the valve assembly is attached to the third boss.

19. The engine system of claim 18, wherein the valve assembly further has a body defining a first inlet passage disposed against the first outlet port and a second inlet passage disposed against the second outlet port.

20. The engine system of claim 19 further comprising an exhaust aftertreatment device in fluid communication with the first and second turbochargers, wherein the exhaust aftertreatment device includes a first inlet connected in fluid communication with the first turbocharger, a second inlet connected in fluid communication with the second turbocharger, and a third inlet connected in fluid communication with the outlet side of the valve assembly.

* * * * *